United States Patent
Dufour et al.

(10) Patent No.: US 10,154,544 B2
(45) Date of Patent: Dec. 11, 2018

(54) PREPARATION OF AN ARTICLE IN GLASS OR IN GLASS-CERAMIC WITH IMPROVED COATING AND SAID ARTICLE

(75) Inventors: Bruno Dufour, Campagne sur Seine (FR); Gaëlle Ferriz, Reims (FR); David Henry, Fontaine le Port (FR); Philippe Lehuede, Yerres (FR)

(73) Assignee: EUROKERA, Chateau-Thierry (FR)

( * ) Notice: Subject to any disclaimer, the term of this patent is extended or adjusted under 35 U.S.C. 154(b) by 928 days.

(21) Appl. No.: 13/697,926

(22) PCT Filed: May 18, 2011

(86) PCT No.: PCT/EP2011/058076
§ 371 (c)(1),
(2), (4) Date: Nov. 8, 2013

(87) PCT Pub. No.: WO2011/144671
PCT Pub. Date: Nov. 24, 2011

(65) Prior Publication Data
US 2014/0291313 A1    Oct. 2, 2014

(30) Foreign Application Priority Data

May 19, 2010    (FR) ...................... 10 53873

(51) Int. Cl.
*H05B 3/74*    (2006.01)
*C03C 17/00*    (2006.01)
*C03C 17/34*    (2006.01)

(52) U.S. Cl.
CPC ............. *H05B 3/74* (2013.01); *C03C 17/007* (2013.01); *C03C 17/34* (2013.01); *C03C 2217/445* (2013.01); *C03C 2217/475* (2013.01); *C03C 2217/485* (2013.01); *Y10T 428/31612* (2015.04)

(58) Field of Classification Search
CPC .......... H05B 3/748; H05B 3/74; H05B 3/746; H05B 2203/032; H05B 3/06; F24C 15/101; C03C 17/007; C03C 17/34; C03C 2217/445; C03C 2217/485; C03C 2217/475; Y10T 428/31612
USPC ..... 219/443.1–459.1, 461.1–468.2; 427/387, 427/384, 385.5, 386, 388.1–388.2, 209, 427/458, 389.7, 255.14; 428/429, 319.1
See application file for complete search history.

(56) References Cited

U.S. PATENT DOCUMENTS

| | | | |
|---|---|---|---|
| 4,801,553 A | 1/1989 | Owen et al. | |
| 4,833,288 A | 5/1989 | Poumey | 219/10.493 |
| 5,232,783 A | 8/1993 | Pawar et al. | |
| 5,269,844 A | 12/1993 | Yamamoto et al. | 106/490 |
| 5,370,903 A | 12/1994 | Mine et al. | |
| 6,182,472 B1 | 2/2001 | Fredholm et al. | |
| 6,660,980 B2 | 12/2003 | Nagata et al. | 219/622 |
| 6,863,923 B1 | 3/2005 | Kalleder et al. | |
| 7,297,731 B2 * | 11/2007 | Walker, Jr. | C03C 25/101 106/287.14 |
| 7,553,519 B2 | 6/2009 | Florent et al. | 427/387 |
| 8,329,302 B2 | 12/2012 | Esemann et al. | |
| 2005/0214545 A1 | 9/2005 | Florent et al. | 428/429 |
| 2007/0215393 A1 | 9/2007 | Voss-Kehl et al. | |
| 2009/0238982 A1 | 9/2009 | Florent et al. | 427/387 |
| 2010/0028629 A1 | 2/2010 | Anton et al. | |

FOREIGN PATENT DOCUMENTS

| | | |
|---|---|---|
| EP | 0861014 | 12/2006 |
| FR | 2726550 | 3/2000 |
| JP | 198942337 | 6/1989 |
| JP | 2001-226634 | 8/2001 |
| JP | 2002200459 | 7/2002 |
| JP | 2006-047504 | 2/2006 |
| JP | 2009229483 A | 10/2009 |

OTHER PUBLICATIONS

R.H. Baney, et al., "Silsesquioxanes", Chemical Reviews, 1995, vol. 95, No. 5, pp. 1409-1430.
Machine Translation JP198942337.
Machine Translation JP2002200459.
JP2013-510621 Office Action.
English Translation of JP2015246198 Office Action dated Jan. 31, 2017, Japan Patent Office.
KR1020127033152 Office Action dated Dec. 2, 2016, Korean Patent Office.

* cited by examiner

*Primary Examiner* — Robert S Walters, Jr.
(74) *Attorney, Agent, or Firm* — Dinsmore & Shohl, LLP

(57) ABSTRACT

A method for preparing an article, the structure of which comprises a substrate of a glass or a glass-ceramic and a coating fixed to at least one portion of the surface of the substrate. In a characteristic way, the coating is generated from at least one loaded polysilsequioxane resin not containing any aryl radical in its structure.

19 Claims, 1 Drawing Sheet

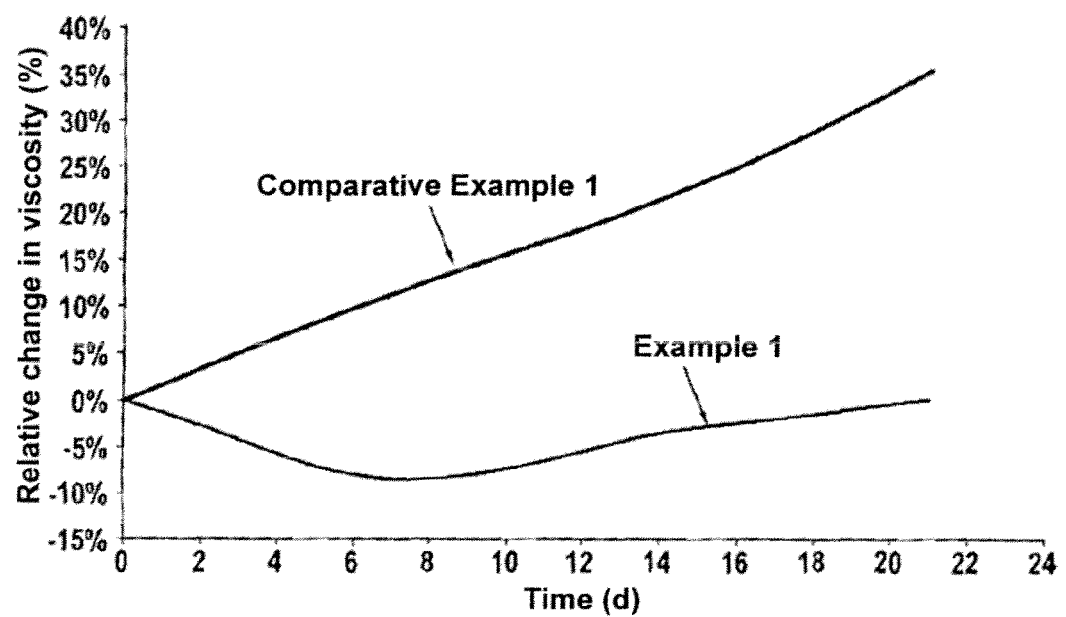

PREPARATION OF AN ARTICLE IN GLASS OR IN GLASS-CERAMIC WITH IMPROVED COATING AND SAID ARTICLE

CROSS-REFERENCE TO RELATED APPLICATIONS

This national stage application under 35 U.S.C. § 371 claims the benefit of priority under 35 U.S.C. § 365 of International Patent Application Serial No. PCT/EP11/058076 filed on May 18, 2011 designating the United States of America, which in turn claims the benefit of priority under 35 U.S.C. § 119 of French Patent Application Serial No. 1053873 filed May 19, 2010, the contents of which are relied upon and incorporated herein by reference in their entirety.

The present invention is located in the context of glass or glass-ceramic articles, with a loaded coating on at least one portion of their surface. The involved coating is optimized with reference to specifications which include many stipulations, notably those specified hereafter and more particularly the following stipulation: low emission of volatile organic compounds (VOCs) when said coating is brought to high temperatures of the order of 100-500° C. The present invention more particularly relates to a method for preparing (obtaining) articles of the type specified above as well as to the articles which may be prepared (obtained) by said method.

Such articles may notably consist in cooking hobs (i.e., cooktops), more or less transparent per se and made opaque by a coating covering at least their face (intended to be positioned) facing the heating elements, so as to hide said heating elements as well as the adhesive product (of the silicone adhesive type) ensuring the seal, used for placing said hobs. The field of application of the invention is however not limited to this context of cooking hobs.

According to the prior art, cooking hobs mainly in glass-ceramic and in glass, notably tempered glass, have already been described, with a colored coating on their "lower" face (or reverse face or underside face), i.e. the one intended to be positioned facing the heating elements.

In patent application EP-A-0 277 075, the presence of decorative or marking elements is very generally provided on the reverse face of a glass-ceramic plate, intended for cooking by induction heating. No details on the involved decorative or marking elements are provided.

In patent application EP-A-1 267 593, transparent glass-ceramic plates are described with colored coatings underneath. Said plates are suitable for induction heating, or even combined heating: heating by induction and radiant heating. The involved colored coatings are enamels with metal pigments, themselves optionally covered with an organic coating (such as polyimide, polyamide, fluorinated, silicone resin) on the "hot" surfaces.

In patent application EP-A-0 861 014, a paint layer resistant to high temperature, preferably to temperatures above 650° C., is provided on the whole of the face opposite to the one intended to receive the cooking utensils. Glass-ceramic heating hobs are involved but no details on the exact nature of the mentioned paints are provided.

The WO-A-2005/092810 application describes different kinds of glass-ceramic or glass plates with a colored coating consisting:
essentially in a mixture of inorganic fillers and of a crosslinkable polysiloxane resin,
essentially in a mixture of inorganic fillers and a crosslinked crosslinkable polysiloxane resin, or
essentially in a mixture of inorganic fillers and of a pyrolyzed crosslinked crosslinkable polysiloxane resin (=a porous mineral matrix based on silica).

The inorganic fillers exert a coloration and reinforcement effect within the resin.

The WO-A-2005/092811 application describes the reinforcement of glass or glass-ceramic plates with such coatings.

Polysiloxane resins, the use of which is recommended in both of these last documents of the prior art, advantageously contain phenyl groups, optionally phenyl and alkyl groups, insofar that said phenyl groups have proved to be necessary for giving the coatings both good stability in temperature and good mechanical properties. It is generally known to one skilled in the art, that high temperature resistant silicones are phenylsiloxanes and that the alkyl groups have a strong influence on mechanical flexibility.

Other types of coating have been proposed for glass or glass-ceramic substrates, notably according to the teachings of U.S. Pat. No. 6,863,923 and of application US-A-2009/0233082. These coatings are based on a binder of the sol-gel type, loaded with pigments. The handling of this type of binder imposes constraints insofar that the latter constantly changes over time, because of hydrolysis and condensation reactions which occur inside it, even at room temperature. The lifetime ("pot life") of this type of binder is therefore very limited.

Moreover in parallel with the chemistry of polysiloxanes (polymers with ($R_2SiO$) units, each silicon atom being bound to two oxygen atoms), there exists a chemistry of polysilsesquioxanes (polymers with ($RSiO_{1.5}$) units, each silicon atom being bound to 3 oxygen atoms). The properties of said polysilsesquioxanes are of course dependent on the nature of R (hydrogen, alkyl, alkenyl, aryl or arylene group, notably). While polysiloxanes are generally linear polymers, polysilsesquioxanes have a 3D structure. They self-organize in fact in different forms. The preparation, general properties and applications of polysilsesquioxanes are reviewed in Chem. Rev., 1995, 95(5).

Patent application JP 2001-226634 describes a coating for substrates of different natures, obtained from a polysilsesquioxane resin (having reactive ethylenic double bonds, allowing crosslinking by radical polymerization) and from organic substances (copolymerizable substances), such as (meth)acrylic monomers. Because of the use of these organic substances, such a coating brought to high temperatures emits VOCs in significant amounts.

Patent application JP 2006-047504 describes antireflective coatings, notably for LCD screens, obtained from polysilsesquioxane resins (having both perfluoroalkyl groups and reactive groups, such as vinyl or epoxy groups), fluorine-containing monomers, such as (meth)acrylic monomers (copolymerizable substances) and fillers, such as colloidal silica. Because of both the use of the monomers and the use of fluorinated compounds, such coatings brought to high temperatures emits VOCs in significant amounts.

In such a context, the inventors desired to propose for glass or glass-ceramic substrates, a coating resistant to high temperatures, which meets the stipulations hereafter in a particularly advantageous way:
1) having satisfactory mechanical properties, notably scratch resistance,
2) having satisfactory optical properties, notably opacity, color stability (after n heating cycles),
3) having good aesthetic quality,
4) minimizing, or even avoiding diffusion of a product of the silicone adhesive type across them, 5) emitting an as low as possible amount of volatile organic compounds (COVs), in particular benzene, or even benzene and formaldehyde, when it is brought to a high temperature (during heating cycles),
6) obtained by a method easy to carry out (notably without any lifetime constraint on the precursor resin), and
7) able to be applied on the substrate by current techniques, such as screen-printing.

BRIEF DESCRIPTION OF DRAWINGS

FIG. 1 shows the relative variation (%) of viscosity versus time (days) of a dispersion, precursor of a coating of the prior art (Comparative Example 1) and of a dispersion, precursor of a coating of an aspect of the disclosure (Example 1).

The credit of the inventors is of having reconsidered the technical problem of VOC emission (most particular benzene), by polysiloxane coatings of the prior art, when they are brought to a high temperature (emission of said VOCs in small amounts; the polysiloxane coatings of cooking hobs developed by the Applicant have of course always been and are always compliant with the recommended thresholds), and of proposing a novel type of coating, more efficient with reference to this technical problem (notably in order to anticipate possible tightening of regulations) and as efficient with reference to the other stipulations of the specifications listed above (notably stipulations 1) and 6) of the specifications). Of course, the novel proposed coating satisfactorily adheres to the glass or glass-ceramic substrates.

According to its first object, the present invention therefore relates to a method for preparing an article, the structure of which comprises a glass or glass-ceramic substrate and a coating fixed to at least one portion of the surface of said substrate. It is understood, with view to the remarks above, that said method is more particularly optimized as to the nature of the coating, a coating capable of resisting to high temperatures (high temperatures to which said coating is expected to be subject, because for example of its layout facing the radiant or induction heating elements), while emitting a small amount of VOCs (in the case in point, less VOCs (less benzene) than the coatings of the prior art with polysiloxane resin).

In a characteristic way, said preparation method comprises:
  making available a substrate in a glass or a glass-ceramic;
  applying on at least one portion of the surface of said substrate, a layer of a dispersion:
    the continuous phase of which essentially consists of at least one polysilsesquioxane resin in solution in a solvent, said at least one polysilsesquioxane resin having units of formula ($HSiO_{1.5}$) and/or of formula ($RSiO_{1.5}$), advantageously of formula ($RSiO_{1.5}$), the radicals R of these units either being identical or not, all different from an aryl radical, and
    the dispersed phase of which essentially consists of mineral fillers;
  the heat treatment of the assembly comprising said substrate and said layer, or of said layer mainly, so as to remove said solvent and to cross-link said resin.

The method of the invention therefore aims at preparing an article, the structure of which comprises a substrate in a glass or in a glass-ceramic and a coating fixed to at least one portion of the surface of said substrate.

The involved substrate in a glass or in a glass-ceramic is generally more or less transparent and the involved coating is generally colored, present for purposes of decoration and/or opacification. Said coating is however not necessarily colored. It may notably be present for acting on diffusion of light and giving a blurred and/or mat aspect without giving color.

The form of the article is conditioned by that of the substrate. For preparing a plate, notably a cooking hob, said substrate therefore has the shape of a plate (with two main substantially parallel faces and small thickness, said thickness is small with view to the dimensions of said two main faces). Such a plate may be planar, may be essentially planar with local deformations (patent application FR 2 726 550 thus describes plates with folded edges; patent application FR 2 777 559 thus describes plates with apertures with deformed perimeter), may include a planar portion and a recessed, convex (wok type) portion, may also be formed on the whole of its surface.

In fact there are no severe limitations as to the shape of the initial substrate used.

In a by no means limiting way, it is indicated here that the sought articles advantageously consist in cooking hobs, as specified above, in fireplace inserts, in fire-doors, in domestic oven doors . . . . The shape of the initial substrate is selected for this purpose.

On at least one portion of the surface of said initial substrate, generally on at least the areas of said surface intended to withstand high temperatures during the use of the sought article, a dispersion layer, precursor of a coating or of at least one constitutive layer of a coating is applied. It should however be noted that within the scope of the application of the method of the invention, the area for applying the dispersion layer, precursor of a coating or of at least one constitutive layer of a coating, is not necessarily localized on the surface intended to be exposed to high temperatures, is not necessarily localized on the areas intended to be the hottest of said surface. Indeed, it may for example be desired to generate the coating on the outer face of oven doors (notably those of pyrolysis ovens), only at the periphery of said outer face (in order to hide the mechanical fittings of the door without preventing viewing of the interior of the oven).

The applied layer moreover is not necessarily of the same composition over all its surface of application. "Different layers" for example of different colors (because of the presence of different mineral fillers within them or of the presence of the same fillers but at different levels) may be deposited on different areas of the surface of application in order to give a different aspect to said areas.

The deposited layer is a dispersion. Conventionally, it contains mineral fillers (dispersed phase) in a binder (continuous phase). It is characterized by the original nature of said binder.

The dispersed phase of said dispersion is not original per se. It therefore essentially consists of mineral fillers. Said mineral fillers are likely to be involved as specified above for different purposes. They ensure at the very least a certain mechanical cohesion of the coating. They also are advantageously involved for notably having the coating adhere to the substrate, in order to minimize the occurrence and propagation of cracks within said coating, in order to reinforce the substrate and/or to modify the aesthetic aspect of the substrate, more particularly for coloration purposes. Different types of fillers may be involved as a supplement; certain types of fillers are suitable for ensuring several functions at the same time, notably those of mechanical reinforcement and coloration. One skilled in the art knows about these fillers, these different types of fillers and is notably aware that their nature and/or size and/or shape may also be optimized with reference to other parameters, such as electric conductivity.

According to advantageous alternative embodiments of the method of the invention:
- at least one fraction of the mineral fillers consists in lamellar fillers (the light diffusion/reflection action or (and) the mechanical reinforcement action of the coating is (are) particularly sought);
- at least one fraction of the mineral fillers consists in pigments (the "coloration" action of the coating is particularly sought).

According to a very advantageous alternative, at least one fraction of said mineral fillers consists in lamellar fillers and at least one fraction of said mineral fillers consists in pigments. These may be different fillers (lamellar fillers on the one hand, and pigments on the other hand) or the same fillers (lamellar pigments).

The mineral fillers may notably consist in $TiO_2$-coated mica platelets, in silica, alumina, borosilicates and/or oxides.

Mineral fillers are generally present in an amount from 10 to 60%, advantageously from 20 to 40%, by weight in the dispersion (dispersion=fillers+binder+solvent+optional additives). Said fillers are generally again found present in the heat treated layer in an amount from 40 to 60% by weight (for 60 to 40% by weight of heat treated binder).

Now, one reaches the key of the invention: the nature of the binder, the nature of the continuous phase of the dispersion, for a large part responsible for the final properties of the coating obtained from said dispersion, more particularly for its VOC emission, when it is brought to a high temperature. Instead and in place of the resins (precursors) of the polysiloxane type of the prior art, the inventors recommend the use of resins (precursors) of the polysilsesquioxane type, free of aryl radicals (with reference to the problem of benzene emission).

It was not obvious to consider this type of 3D resins (crosslinked but further containing a few reactive groups of the —SiOH type and/or potentially reactive groups of the SiOAlkyl type), a priori insoluble in most usual solvents. Only the resins of this type, with low molecular weight, are soluble in the most common organic solvents. Within the scope of the method of the invention, this type of polysilsesquioxane resin with low molecular weight is used insofar that said resin for its application is in solution in a solvent. In a by no means limiting way, it may be indicated here that the involved solvent (which may strictly consist in a mixture of solvents) may notably be a terpenic hydrocarbon, an alcohol, such as isopropanol or terpineol, a ketone or a mixture of these solvents, and the resin used generally has a molecular weight (Mw) of less than 100,000 g/mol (advantageously less than 10,000 g/mol).

It was not obvious that this type of 3D aryl-free (notably phenyl-free) resin is suitable for obtaining a coating, positively meeting the different stipulations recalled above. Now, such is the case.

In a characteristic way, the method of the invention therefore comprises the application of a layer of a dispersion, the continuous phase of which essentially consists of at least one polysilsesquioxane resin not containing any aryl group, in solution in a solvent. The term of "essentially" excludes the presence of co-precursor organic substances of the coating a priori capable of generating VOCs when said coating is brought to a high temperature (it more particularly excludes the presence of any monomer such as those disclosed in JP patent applications: JP 2001-226634 and JP 2006-047507), but cannot exclude the presence in small amount(s) of at least one additive, selected from wetting agents, adhesion promoters, bubble-removing agents and other agents. Said at least one additive, if present, is present in an amount of less than 10%, generally less than 5%, by weight, based on the (dry) resin weight. The continuous phase of the dispersion therefore contains said at least one polysilsesquioxane resin, said solvent and optionally said at least one additive.

The involved polysilsesquioxane resins are with $(HSiO_{1.5})$ or/and $(RSiO_{1.5})$ units, R therefore being different from an aryl radical. A single polysilsesquioxane resin or a mixture of at least two polysilsesquioxane resins (different by their formula and/or their molecular weight) may be present in the dispersion. Said single polysilsesquioxane resin or each of said polysilsesquioxane resins have units of either one or both of the formulae specified above, either (all) identical or not. To this day, are mainly marketed polysilsesquioxane resins with $(HSiO_{1.5})$ units (so-called HSQ resins for Hydrogen Silsesquioxane Resin) and polysilsesquioxane resins with $(RSiO_{1.5})$ units, said units all containing the same radical R. However some are also found with units of different formula and in the case in point, the synthesis of polysilsesquioxane resins having units of different formula does not pose any particular problem to one skilled in the art. Whatever the case, the polysilsesquioxane resin(s) used for carrying out the method of the invention does(do) not contain any aryl radical, notably no phenyl radical (with reference to the technical problem of benzene emission by the final coating brought to a high temperature) and is(are) soluble in a solvent (with reference to the constitution of the dispersion and to the application of said dispersion on at least one portion of the surface of the substrate). The presence of any heteroatom (such as N, O, X (halogen) . . . ) in radical R is obviously implicitly excluded in reference to the technical problem of the emission of VOCs.

It is understood that the method of the invention provides a new commercial outlet for polysilsesquioxane resins, as identified above. According to the present invention, a novel use for these resins as precursors (raw materials) of (loaded) surface coatings of glass or glass-ceramic substrates is therefore proposed.

The deposited dispersion layer (the loaded original binder) generally has a thickness (e) between 10 and 40 μm (10 μm≤e≤40 μm). It may be applied by any conventional technique, adapted to its viscosity. Thus, the application of this layer may notably be performed with a brush, a doctor blade, by spraying, by electrostatic deposition, by soaking, by curtain coating, with a whirler, by the so-called inkjet technique or by screen-printing. It is advantageously applied by screen-printing.

There is every reason to insist on the fact that with view to the nature of the resin, there is no pot life problem.

Once the substrate is covered, over at least one portion of its surface, by the dispersion, said dispersion is heat-treated. In fact, the heat treatment affects the assembly: substrate+layer (said assembly being for example positioned in an oven) or mainly, essentially said layer (heating elements being for example positioned facing said layer and essentially heating said layer). Said heat treatment aims at removing the solvent from the dispersion (from the deposited dispersion layer) and at crosslinking the resin of said dispersion. It was seen above that the involved 3D crosslinked resins further contain reactive groups (—SiOH) and/or potentially reactive groups (—SiOAlkyl) (generally at least a few % by moles). The heat treatment crosslinks said resin via said reactive and/or potentially reactive groups. Said heat treatment should not significantly pyrolyze said resin so as to generate a coating with acceptable porosity and acceptable mechanical properties.

Said heat treatment is carried at a given temperature (notably in a pre-heated oven) or following a thermal cycle.

Generally, said heat treatment mainly comprises the submission of the assembly: substrate+layer or of said layer mainly, to temperature(s) beyond 100° C., advantageously beyond 150° C., very advantageously beyond 350° C. Generally said heat treatment does not impose temperatures beyond 550° C. (most particularly with reference to the damageable pyrolysis phenomena mentioned above).

One skilled in the art is capable of controlling or even optimizing the temperature/time parameters of said heat treatment.

The polysilsesquioxane resin(s) used does(do) therefore not contain any aryl (notably benzyl) group in its(their) formula.

This may notably be at least one polysilsesquioxane resin having units of formula ($HSiO_{1.5}$) or/and ($RSiO_{1.5}$), the radicals R of these units, either identical or different, being selected from the group consisting in:
  the linear and branched alkyl groups having 1-6 carbon atoms (of formula: $C_nH_{2n+1}$ with n=1, 2, 3, 4, 5 or 6)
  the linear and branched alkenyl groups having 2-6 carbon atoms (of formula: $C_nH_{2n-1}$ with n=2, 3, 4, 5 or 6, when a single ethylenic double bond is present; the presence of more than one ethylenic double bond being not at all excluded); and
  the cycloalkyl groups having 3-6 carbon atoms (of formula $C_nH_{2n-1}$ with n=3, 4, 5 or 6).

Advantageously, said at least one polysilsesquioxane resin has ($RSiO_{1.5}$) units with R (either identical or different) selected from the group consisting in the (linear and branched) $C_1$-$C_6$ alkyl groups and the $C_3$-$C_6$ cycloalkyl groups. Such resins generate coatings which emit no or only very little benzene when they are brought to a high temperature.

Very advantageously, said at least one polysilsesquioxane resin has ($RSiO_{1.5}$) units, the radicals R of the different units (either identical or different) being selected from the group consisting in the linear and branched alkyl groups including 1-3 carbon atoms and the cycloalkyl groups including 3-6 carbon atoms. The corresponding coating, brought to a high temperature, emits no or very little benzene and has limited emission of formaldehyde.

According to an alternative, the radicals R of all the units of the resin(s) used (with ($RSiO_{1.5}$) units) are identical. They are advantageously selected from the groups identified above. According to another alternative, the resin used is an HSQ resin (with ($HSiO_{1.5}$) units).

According to a particularly preferred alternative, the polysilsesquioxane resin used is with identical units ($RSiO_{1.5}$), with R=a methyl group ($CH_3$). Such resins emit no or very little benzene and emit less formaldehyde than polysiloxane resins of the prior art. Their use within the scope of the application of the method of the invention is particularly recommended.

The layer of the dispersion with original binder may be deposited on the surface (on at least one portion of said surface) of the exposed (bare) substrate. It may also be deposited on at least one layer deposited beforehand on said surface.

This at least one sub-layer is opportunely present with reference to the coloration and/or scratch resistance of the final coating. This at least one sub-layer should not obviously be capable of emitting benzene or another VOC in significant amounts. The idea is not ruin the positive effects of the use of polysilsesquioxane resin (free of any aryl radical). Said at least one sub-layer is opportunely per se a mineral layer or a precursor layer of a mineral layer or of an essentially mineral layer. This may notably be an enamel, a metal coating giving a mirror aspect, a coating with a loaded sol-gel type binder (this last type of coating by undergoing heat treatment is totally or partly mineralized). The presence of an organic portion in the final sub-layer may actually be tolerated, insofar that it remains minimal (it may thus remain minimal because of the nature of the precursor sub-layer (with a low organic fraction) and/or because of the heat treatment and/or because of the small thickness of the final layer).

This at least one sub-layer is deposited by methods known per se, for example by sputtering, by physical vapor phase deposition, by screen-printing . . . .

The method of the invention may strictly only comprise the application of a single dispersion layer with an original binder on the exposed (bare) substrate or on the substrate already coated with at least one sub-layer as specified above.

According to other alternative embodiments, it further comprises after said application of said dispersion layer with an original binder, before and/or after said heat treatment, the application of at least another layer (of course not capable of emitting VOCs in significant amounts because of its nature and/or its localization, this in order not to ruin the positive effects of the use of the polysilsesquioxane resin), generally the application:
  either (generally in a discontinuous way), on only at least one area not intended to be subject to high temperatures (a so-called cold area), of an additional organic layer containing mineral fillers, precursor of a layer capable, when brought to high temperature, of emitting benzene (significant amounts of benzene);
  or, on whole or part of the surface of said substrate, of an additional layer of a dispersion, the continuous phase of which essentially consists of at least one polysilsesquioxane resin in solution in a solvent, said at least one polysilsesquioxane resin having units of formula ($HSiO_{1.5}$) or/and of formula ($RSiO_{1.5}$), advantageously of formula ($RSiO_{1.5}$), the radicals R of these units either being identical or not, all different from an aryl radical, and the dispersed phase of which essentially consists of mineral fillers.

Within the scope of the first alternative, it is possible to afford depositing precursor layers of resins capable of emitting benzene (and other VOCs) when they are brought to a high temperature (for example, precursor layers of resins used according to the prior art, of the polysiloxane type with phenyl groups), insofar that said resins are not capable of being brought to a high temperature, insofar that they are only deposited on cold area(s). Within the scope of this first alternative, the deposited additional organic layer (containing mineral fillers) regardless of its exact nature, is a precursor of a layer without any particular restriction as to the emission of benzene when it is brought to a high temperature.

Within the scope of the second alternative, a dispersion layer of at least one polysilsesquioxane resin not capable of releasing benzene (in significant amounts) is deposited. This layer may be deposited both in hot area(s) and in cold area(s). It intervenes on all or part of the relevant surface. This is therefore a second layer of the polysilsesquioxane resin type (free of any aryl radical). Said second layer is not necessarily identical with the first.

The layers deposited within the frame of said first and second alternatives are also layers containing mineral fillers. It is seen that the mechanical cohesion of the resulting coating is at stake. Such a layer advantageously intervenes in order to increase the scratch resistance of the final coating. This may notably be a protective layer on a decorative layer.

The method of the invention may therefore be carried out according to many alternatives and includes:
the optional application of at least one sub-layer,
the application of a dispersion layer, the continuous phase of which essentially consists of a polysilsesquioxane resin without any aryl group, and
the optional application of an additional layer of one of the two types specified above (a generally discontinuous layer, (of the polysiloxane type, for example) according to the prior art or a new continuous or discontinuous layer of the polysilsesquioxane type, recommended according to the invention as a base layer). Both polysilsesquioxane resins of both layers are either of identical nature or not. Advantageously, they are of same nature (either loaded or not in an identical way).

It was seen above that the method of the invention is advantageously applied for preparing an article such as a cooking hob.

According to an advantageous alternative, the method of the invention comprises:
making available a plate in a glass-ceramic or in a glass, and
applying a layer of the dispersion (with a polysilsesquioxane binder without any aryl radical), on all or part of the surface of both (main) faces of said plate or on all or part of the surface of a single (main) face of said plate.

Within the scope of this advantageous alternative, the method of the invention may comprise an application by screen-printing, over the whole surface of one face of said plate, of a dispersion layer, the continuous phase of which essentially consists of a polysilsesquioxane resin with units of formula ($CH_3SiO_{1.5}$) in solution in a solvent and the dispersed phase of which essentially consists of lamellar pigments; followed by a heat treatment of the assembly comprising said plate and said layer at temperature(s) above 350° C. and by an application by screen-printing of an additional layer on at least the cold areas (areas which are not intended to be subject to high temperatures) of said face of said plate.

Said application by screen-printing over the whole surface of one face of said plate (the one intended to be positioned facing the heating elements) is carried out, as indicated above, on said exposed surface or covered beforehand with a mineral coating.

According to its second object, the present invention relates to articles able to be obtained after carrying out the method of the invention as described above. Said articles have a structure which comprises a substrate in a glass or in a glass-ceramic and a coating fixed to at least one portion of the surface of said substrate.

In a characteristic way, said coating was obtained by the method of the invention: from at least one resin of the polysilsesquioxane type resin without any aryl radical (notably without any phenyl radical) containing mineral fillers.

Considering the above statements, it is understood that said coating, either continuous or not, is able of comprising several layers of same nature or of different nature (for example: an optional mineral or essentially mineral sub-layer+a layer derived from at least one loaded polysilsesquioxane resin without any aryl radical+an optional overlayer derived from a resin of the prior art, for example of the loaded polysiloxane type or of at least one loaded polysilsesquioxane resin without any aryl radical).

The articles of the invention advantageously consist in cooking hobs, (intended to be) arranged out above heating elements, with their face including said coating or one of their faces including said coating positioned facing said heating elements. Said heating elements advantageously consist in induction heating elements.

The present invention is now illustrated in a by no means limiting way, by the examples (comparative examples and inventive examples) hereafter. Its advantage emerges from considering in parallel said examples and comparative examples. It is most particularly illustrated in the appended FIG. 1.

Said FIG. 1 shows the relative variation (%) of viscosity (Brookfield viscosity (mPa·s)) versus time (days), of a dispersion, precursor of a coating of the prior art (see comparative Example 1 hereafter) and of a dispersion, precursor of a coating of the invention (see Example 1 hereafter). The conditions for measuring the viscosity are specified hereafter (point I.2)).

I. COMPARATIVE EXAMPLES 1 AND 2 AND EXAMPLES 1 TO 3 OF THE INVENTION

1] Raw Materials

The main raw materials identified hereafter were used.
Solvent: terpineol (CAS 8000-41-7) marketed by Sigma.
Mineral fillers: different types of fillers were used:
pigments marketed by MERCK under the commercial names of Iriodin 123 (white pigment) and Iriodin 323 (gold pigment): these are mica platelets coated with $TiO_2$;
other ones marketed by Ciba under the commercial name of Xymara Satin Black Pearl (black pigment): these are also coated mica platelets;
other ones marketed by Ferro under the commercial name Ferro 240137 (black pigment): these are cobalt, chromium, iron and nickel oxides.
Binder:
for the comparative Example 1, a sol-gel type resin (noted as CS1) was prepared from methyltriethoxysilane (MTEOS) and from tetraethylorthosilicate (TEOS): see hereafter;
for the Examples 1-3 of the invention, a commercial powder of polymethylsilsesquioxane (PMS) resin (marketed by Wacker (DE) under the commercial name of Belsil PMS-MK) was used in a characteristic way. The resin has the chemical formula $(CH_3SiO_{1.5})_n$ with n=130-150; it has a density of 1.1 g/cm$^3$ and its average molecular weight (Mw) is 9,400 g/mol. It contains 4% by moles of ethoxy functions.

2] Preparation of the Dispersion a) As regards the comparative Example 1, the raw materials identified in Table 1 hereafter were used in the amounts indicated in said Table 1.

The silicone base CS1 (a base of the sol-gel type (MTEOS/TEOS), of the type of the one of Example 3 of U.S. Pat. No. 6,836,923) was prepared as follows. 250 g of methyltriethoxysilane [CAS 2031-67-6] and 87 g of tetraethylorthosilicate [CAS 78-10-4] were loaded into a 1 liter flask. 141 g of colloidal silica solution Ludox HS30 [CAS 7631-86-9] were added to this mixture under vigorous stirring. The mixture still under stirring was then cooled to 0° C. and 2.53 g of 37% by weight hydrochloric acid were added dropwise. After 30 minutes, the reaction medium was diluted by adding 300 g of terpineol [CAS 8000-41-7]. The mixture was then left under stirring at room temperature for 16 hours. Finally, about 269 g of ethanol produced by the hydrolysis reaction, were removed under reduced pressure with a rotary evaporator.

To the thereby obtained silicone base CS1, were added pigments, one additive (silicone oil (noted as PDMS)) involved with reference to wettability and coating and butanol as a co-solvent with which the viscosity may be adjusted, as indicated in Table 1.

The resulting composition (dispersion) was mixed using a three-cylinder mixer.

b) As regards Examples 1-3, the polymethylsilsesquioxane resin was dissolved in an amount of 50% by weight, into the terpineol, under stirring, at room temperature, in order to obtain the silicone base MS1.

To said silicone base MS1, were added the pigments, an additive (silicone oil (noted as PDMS)) involved with reference to wettability and to coating, and butanol as a co-solvent with which the viscosity may be adjusted, as indicated in said Table 1.

The resulting compositions (dispersions) were mixed using a three-cylinder mixer.

TABLE 1

| Compositio | Comparative Example 1 | | Example 1 | | Example 2 | | Example 3 | |
|---|---|---|---|---|---|---|---|---|
| Silicone base | CS1 | 37.5 g | MS1 | 37.5 g | MS1 | 37.5 g | MS1 | 37.1 g |
| Pigment | Iriodin 123 | 19.5 g | Iriodin 123 | 19.5 g | Iriodin 323 | 21 g | Xymara Satin Black Pearl | 15 g |
| Pigment | Ferro 240137 | 1.5 g | Ferro 240137 | 1.5 g | | | | |
| Additive | PDMS | 1.5 g | PDMS | 1.5 g | PDMS | 1.5 g | PDMS | 1.5 g |
| Co-solvent | Butanol | 3 g | Butanol | 3 g | Butanol | 1 g | Butanol | 4.5 g |

The dispersions of comparative Example 1 and of Example 1 are pale grey compositions (the grey is obtained by mixing the white pigment Iriodin 123 with the black pigment Ferro 240137). The dispersion of Example 2 has a gold color, the one of Example 3 is dark grey. Different coating colors may thereby be obtained easily by carrying out the method of the invention (with different pigments).

The dispersions of comparative Example 1 and Example 1 are therefore different by the nature of their binder. They differ further by their preparation method. The simplicity of the method for preparing the dispersion according to Example 1 very clearly shows the actual advantage of the method of the invention (within the scope of its application, there is no constraint with reference to the lifetime of the dispersion (insofar that said dispersion is stable, which is not the case of the dispersion according to the prior art (see hereafter as well as appended FIG. 1)).

Monitoring the time stability (lifetime) of the dispersions of comparative Example 1 and of Example 1 was achieved by measuring the viscosity of said dispersions. For this purpose, a Brookfield model DV-I Prime viscosimeter was used. The measurements were conducted with module No. 6 and a speed of rotation of 100 rpm. The results of said measurements are indicated in Table 2 hereafter. They are also marked on the appended FIG. 1.

TABLE 2

| | Comparative Example 1 | | Example 1 | |
|---|---|---|---|---|
| Time (day) | Viscosity (mPa · s) | Relative variation | Viscosity (mPa · s) | Relative variation |
| 0 | 3760 | 0.0% | 3120 | 0.0% |
| 7 | 4180 | 11.2% | 2850 | −8.7% |
| 14 | 4570 | 21.5% | 3000 | −3.8% |
| 21 | 5080 | 35.1% | 3120 | 0.0% |

While a change in viscosity is clearly identifiable for the dispersion of comparative Example 1 (a 35% increase after 3 weeks), the viscosity of the dispersion of Example 1 remains stable, which gives a clear advantage to the method of the invention.

3] Deposition of Dispersions (Compositions) on a Glass-Ceramic Plate

The deposits were applied by screen-printing, by using screens of 32 wires/cm$^2$ on one face of transparent glass-ceramic plates of the Keralite® type (marketed by the Applicant).

The deposited layers have a thickness of about 25 μm.

4] Heat Treatment

The coated glass-ceramic plates are dried for 30 min at 120° C.

Next, they undergo the hereafter thermal cycle in a static oven:
rise from 25° C. to 350° C. in 5 min
maintaining 350° C. for 20 min
rise from 350° to 480° C. in 20 min
maintaining 480° C. for 5 min
fast cooling to 25° C.

5] Properties of the Thereby Obtained Coatings

The main properties of the obtained different pale grey coatings were measured as follows.
Scratch resistance was evaluated by visual examination of the upper side of the glass-ceramic plate (on the side opposite to the grey layer). Several scratch lines are formed, at different forces, with the scratch Hardness Tester TQC SP0010 on the layer. The value of scratch resistance expressed in Newtons (N), is then the value for which no marking may be observed on the upper side of the glass-ceramic with the highest force value.

Benzene emission was measured, by a comparative method, by direct thermal desorption at 400° C. for 1 hr coupled with gas chromatography. The amounts of emitted benzene are calculated by numerical integration of the benzene peak obtained on the chromatogram, based on the analyzed amount of sample. The results are then normalized with, as unit value, the result obtained for the comparative Example 1.

Formaldehyde emission was measured after 2 hrs at 400° C., by trapping it in a functionalized column with dinitrophenylhydrazine, by extracting the formed hydrazone and by analysis with high pressure liquid chromatography (HPLC).

The thickness was measured with a surface roughness profilometer Hommel Tester T2000.

The opacity test was positive if an object placed behind the coating was not visible.

The aesthetic quality was evaluated by visual examination.

The stability of the color was evaluated (relatively to a reference) after maintaining the coated plate at 575° C. for 10 min.

The obtained results of the measurements appear in Table 3 below.

One is also interested in the same way in the properties of coatings of plates of the prior art. For comparative Example 2, the pale grey decorative coating of glass-ceramic plates available at the Applicant (Eurokera) under the Keraresin® brand was considered; said coating is based on a methylphenylsiloxane polymer.

TABLE 3

| | Comparative Example 1 | Comparative Example 2 | Example 1 |
|---|---|---|---|
| Color | Grey | Grey | Grey |
| Scratch resistance, R (Newtons) | R < 1 | 1 < R < 2 | 1 < R < 2 |
| Benzene emission | 1 | 93 | 0.19 |
| Formaldehyde emission (mg/m$^2$) | 7.2 | 12 | 8 |
| Thickness (μm) | 30 | 25 | 27 |
| Opacity | − | + | + |
| Aesthetic quality | OK | OK | OK |
| Color stability | | + | + |

This table shows that with the method of the invention carried out with the composition of Example 1 (polysilsesquioxane resin without any aryl radical) a decorative coating may be obtained, which meets the specifications listed in the introduction of the present text. Said coating has satisfactory scratch resistance (sufficient for its use), good opacity, good aesthetic quality and good color stability. It emits very small amounts of benzene and less formaldehyde than the coating of comparative Example 2.

The coating of comparative Example 1 (obtained from a sol-gel resin) has very poor mechanical properties, which confirms the importance of the nature of the binder. Further, its opacity is slightly not as good as that of the coatings of comparative Example 2 and Example 1.

The coating of comparative Example 2 (coating of the prior art) expectedly has suitable mechanical and aesthetic properties. However, under the test conditions, it releases more benzene and formaldehyde than the coating according to the invention.

II. EXAMPLES 4 AND 5 OF THE INVENTION

The scratch resistance of the decorative coatings of the plates may be improved by depositing a protective layer on the decorative layer (according to the invention).

Plates coated according to Example 1 above (grey coating of the invention) were then covered with a second layer, the composition of which is specified in Table 4 below. This composition in a characteristic way contains the silicone base MS1 (see above: based on the polymethylsilsesquioxane resin).

TABLE 4

| Composition | Example 4 | | Example 5 | |
|---|---|---|---|---|
| Silicone base | MS1 | 37.5 g | MS1 | 37.5 g |
| Pigment | Iriodin 123 | 21 g | Xymara Satin Black Pearl | 18 g |
| Pigment | Xymara Satin Black Pearl | 2.5 g | | |
| Co-solvent | Butanol | 6 g | Butanol | 7.5 g |

The second layer is deposited by screen-printing under the same conditions (as the first layer).

After depositing said second layer, the plates are treated at 400° C. for 30 min, in the static oven. This heat treatment under less severe conditions (than those of the heat treatment of the first layer), enables a protective layer to be obtained which has better mechanical properties. The properties of glass-ceramics coated with both coatings were measured under the same conditions as earlier. The obtained results appear in Table 5 hereafter.

In the first part of said Table 5, the results obtained with the single coating (of the prior art) of comparative Example 2 above and the single coating (of the invention) of Example 1 above are reported.

TABLE 5

| | Comparative Example 2 | Example 1 | Example 4 | Example 5 |
|---|---|---|---|---|
| Color of the decorative coating | Grey | Grey | Grey | Grey |
| Scratch resistance, R (Newtons) | R < 1 < 2 | 1 < R < 2 | 4 | 9 |
| Benzene emission | 93 | 0.19 | 0.27 | 0.27 |
| Formaldehyde emission (mg/m$^2$) | 12 | 8 | 14 | 10 |
| Thickness (μm) | 25 | 27 | 51 | 48 |
| Opacity | + | + | + | + |
| Aesthetic quality | + | + | + | + |
| Color stability | + | + | + | + |

The bilayer coatings of Examples 4 and 5 have improved scratch resistance. They release very small amounts of benzene as compared with the coating of comparative Example 2 and very little formaldehyde.

The invention claimed is:

1. A method for preparing a cooktop, which comprises a glass or glass-ceramic substrate and a coating fixed to at least one portion of a surface of said substrate, said method comprising:

making available a substrate of a glass or a glass-ceramic;
applying on at least one portion of a surface of said substrate, a layer of a dispersion: a continuous phase of which essentially consists of at least one polysilsesquioxane resin in solution in a solvent, said at least one polysilsesquioxane resin having units of formula (RSiO$_{1.5}$), R being identical or not, all different from an aryl group and being selected from a group consisting of linear and branched alkyl groups having 1 to 6 carbon atoms and cycloalkyl groups having 3 to 6 carbon atoms, and a dispersed phase consisting essentially of mineral fillers; and heat-treating the layer of the dispersion so as to remove said solvent and to crosslink said resin, wherein the heat-treating comprises subjecting the layer of the dispersion to a temperature above 350° C. and no more than 550° C., thereby providing the cooktop.

2. The method according to claim 1, wherein said at least one polysilsesquioxane resin has units ($RSiO_{1.5}$), R being selected from the group consisting of linear and branched alkyl groups having 1 to 3 carbon atoms and cycloalkyl groups having 3 to 6 carbon atoms.

3. The method according to claim 1, wherein at least one fraction of said fillers consists of lamellar fillers.

4. The method according to claim 1, wherein at least one fraction of said fillers consists of pigments.

5. The method according to claim 1, wherein said application of said layer is performed with a brush, with a doctor blade, by spraying, by electrostatic deposition, by soaking, by curtain coating, with a whirler, by ink jet printing, or by screen-printing.

6. The method according to claim 1, further comprising, after said application of said layer, and before and/or after said heat treatment, applying:

on only at least one area not intended to be subject to food cooking temperatures during cooking of food with the cooktop, an additional organic layer containing mineral fillers, precursor of a layer capable of emitting benzene; or on all or part of the surface of said substrate, an additional layer of a dispersion, a continuous phase of which essentially consists of at least one polysilsesquioxane resin in solution in a solvent, said at least one polysilsesquioxane resin having units of formula ($HSiO_{1.5}$) and/or of formula ($RSiO_{1.5}$), R being identical or not, and all different from an aryl group and a dispersed phase of which essentially consists of mineral fillers.

7. The method according to claim 1, wherein said substrate is a plate and said application of said layer is performed on all or part of the surface of both faces of said plate or on all or part of the surface of a single face of said plate.

8. The method according to claim 7, wherein the layer of the dispersion comprises a first layer, the continuous phase of the dispersion essentially consists of a polysilsesquioxane resin with units of formula ($CH_3SiOi_{0.5}$) in solution in a solvent and the dispersed phase of which essentially consists of lamellar pigments, and the method further comprises:

applying, by screen-printing on the whole surface of a face of said plate, the first layer of the dispersion;

heat-treating the plate and the first layer at a temperature above 350° C.; and applying, by screen-printing, a second layer comprising the dispersion on portions of the first layer of the dispersion that correspond with at least cold areas of said face of said plate, the cold areas defined as regions of said plate that are not subjected to food cooking temperatures during cooking of food with the cooktop.

9. The method according to claim 1, wherein the at least one polysilsesquioxane resin has units ($RSiO_{1.5}$), R either identical or not, being selected from a group consisting of linear and branched alkyl groups having 2 to 6 carbon atoms.

10. The method according to claim 1, wherein the surface having the layer of the dispersion applied thereon is a first surface and the glass or glass-ceramic substrate of the cooktop further comprises a second surface opposite the first surface, wherein the first surface and the second surface are substantially parallel.

11. The method according to claim 10, the method further comprising positioning the cooktop adjacent one or more heating elements, such that the first surface faces the one or more heating elements.

12. A method for preparing a cooktop, which comprises a glass or glass-ceramic substrate and a coating fixed to at least one portion of a surface of said substrate, said method comprising:

making available a substrate of a glass or a glass-ceramic;

applying on at least one portion of a surface of said substrate, a layer of a dispersion:

a continuous phase of which essentially consists of at least one polysilsesquioxane resin in solution in a solvent, said at least one polysilsesquioxane resin having units of formula ($HSiO_{1.5}$) and/or of formula ($RSiO_{1.5}$), R being identical or not, and all different from an aryl group, and a dispersed phase consisting essentially of mineral fillers;

heat-treating the layer of the dispersion so as to remove said solvent and to crosslink said resin, wherein the heat-treating comprises subjecting the layer of the dispersion to a temperature above 350° C. and no more than 550° C., thereby providing the cooktop, and further wherein said application of said layer of the dispersion is performed on at least one layer deposited beforehand; said at least one layer deposited beforehand being a mineral layer or a layer precursor of a mineral layer.

13. The method according to claim 12, wherein said at least one polysilsesquioxane resin has units ($RSiO_{1.5}$), R either identical or not, being selected from a group consisting of linear and branched alkyl groups having 1 to 6 carbon atoms and cycloalkyl groups having 3 to 6 carbon atoms.

14. The method according to claim 12, wherein said at least one polysilsesquioxane resin has units ($HSiO_{1.5}$), R either identical or not, being selected from a group consisting of linear and branched alkyl groups having 1 to 3 carbon atoms and cycloalkyl groups having 3 to 6 carbon atoms.

15. The method according to claim 12, wherein said at least one polysilsequioxane resin is a polysilsequioxane resin with units ($CH_3SiO_{1.5}$).

16. The method according to claim 12, wherein at least one fraction of said fillers consists of lamellar fillers.

17. The method according to claim 12, wherein at least one fraction of said fillers consists of pigments.

18. The method according to claim 12, wherein said application of said layer is performed with a brush, with a doctor blade, by spraying, by electrostatic deposition, by soaking, by curtain coating, with a whirler, by ink jet printing, or by screen-printing.

19. The method according to claim 12, wherein the at least one polysilsesquioxane resin has units ($HSiO_{1.5}$), R either identical or not, being selected from a group consisting of linear and branched alkyl groups having 2 to 6 carbon atoms.

* * * * *

UNITED STATES PATENT AND TRADEMARK OFFICE
CERTIFICATE OF CORRECTION

PATENT NO. : 10,154,544 B2  
APPLICATION NO. : 13/697926  
DATED : December 11, 2018  
INVENTOR(S) : Bruno Dufour et al.

Page 1 of 1

It is certified that error appears in the above-identified patent and that said Letters Patent is hereby corrected as shown below:

On the Title Page

Column 1, item (75), Inventors, Line 1, delete "Campagne" and insert -- Champagne --, therefor.

Column 2, item (57), Abstract, Line 5, delete "polysilsequioxane" and insert -- polysilsesquioxane --, therefor.

In the Claims

Column 15, Line 45, Claim 8, delete "($CH_3SiO_{0.5}$)" and insert -- ($CH_3SiO_{1.5}$) --, therefor.

Column 16, Line 58, Claim 19, delete "($HSiO_{1.5}$)," and insert -- ($RSiO_{1.5}$), --, therefor.

Signed and Sealed this  
Seventh Day of April, 2020

Andrei Iancu  
*Director of the United States Patent and Trademark Office*